Dec. 22, 1925.
1,566,823
C. B. CARTER
PROCESS OF PRODUCING A PHENOLIC CONDENSATION PRODUCT
Filed July 26, 1924
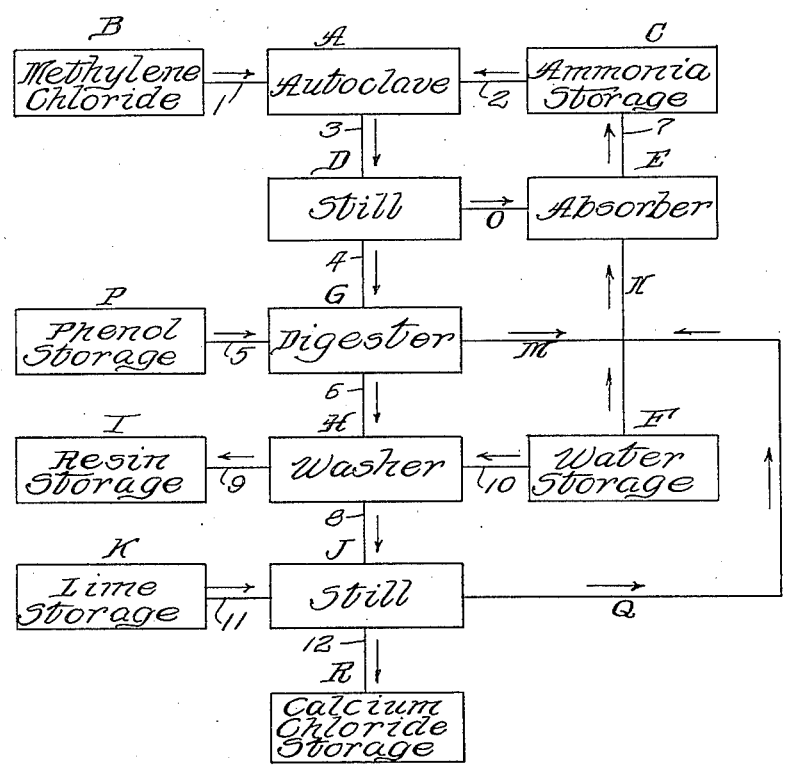
Inventor
Carrie B. Carter Patented Dec. 22, 1925.

1,566,823

UNITED STATES PATENT OFFICE.

CARNIE B. CARTER, OF PITTSBURGH, PENNSYLVANIA, ASSIGNOR TO S. KARPEN & BROS., OF CHICAGO, ILLINOIS, A CORPORATION OF WEST VIRGINIA.

PROCESS OF PRODUCING A PHENOLIC CONDENSATION PRODUCT.

Application filed July 26, 1924. Serial No. 728,465.

*To all whom it may concern:*

Be it known that I, CARNIE B. CARTER, a citizen of the United States, residing at Pittsburgh, in the county of Allegheny and State of Pennsylvania, have invented a new and useful Improvement in Processes of Producing a Phenolic Condensation Product, of which the following is a specification.

This invention relates to the production of phenolic condensation products; and the primary object is to provide a simple and practical process for producing such products by digesting a phenolic body in an aqueous solution of hexamethylenetetramine and ammonium chloride. Such a solution may be obtained cheaply, and in a simple manner, by causing a reaction between methylene chloride and aqueous ammonia; or, it may be obtained by dissolving a mixture of hexamethylenetetramine and ammonium chloride produced by reaction between methylene chloride and liquid ammonia.

The discovery that such a solution can be employed for effecting condensation of a phenolic body renders it possible to utilize hexamethylenetetramine produced in the manner suggested without the necessity of effecting separation of the hexamethylenetetramine from the ammonium chloride produced by reaction between methylene chloride and ammonia.

It has been demonstrated that methylene chloride reacts with ammonia, either as liquid ammonia, or as ammonia in aqueous solution, to form hexamethylenetetramine and ammonium chloride in accordance with the following equation:

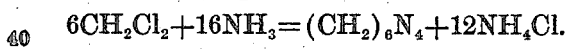

$$6CH_2Cl_2 + 16NH_3 = (CH_2)_6N_4 + 12NH_4Cl.$$

When carried out in liquid ammonia solution the reaction leads to the production of hexamethylenetetramine and ammonium chloride in theoretical proportions and the salts are present in the final product both in solution in liquid ammonia and as a crystalline precipitate. In order to make recovery of the hexamethylenetetramine from such products it is only necessary to evaporate the liquid ammonia and extract the residual salts with suitable solvents, such as carbon tetrachloride or chloroform. When carried out in aqueous ammonia solutions, however, the reaction gives rise to an aqueous solution of hexamethylenetetramine and ammonia chloride from which hexamethylenetetramine cannot be recovered by simple evaporation of the water and extraction of the residual salts with chloroform or other solvents. The use of solvents to effect the extraction is expensive, moreover.

Evaporation of an aqueous solution of hexamethylenetetramine and ammonium chloride is accompanied by secondary reactions which result in the production of the hydrochloride of hexamethylenetetramine and the actual loss of some hexamethylenetetramine through hydrolysis which permits of the escape of free formaldehyde. These secondary reactions may be illustrated as follows:

(1) $NH_4Cl + H_2O \rightleftharpoons NH_4OH + HCl.$
(2) $NH_4OH \rightleftharpoons NH_3 + H_2O.$
(3) $(CH_2)_6N_4 + HCl \rightleftharpoons (CH_2)_6N_4 \cdot HCl.$
(4) $(CH_2)_6N_4 + 6H_2O(acid) \rightleftharpoons 6CH_2O + NH_3.$ Among the various reactions which take place on evaporating a solution containing hexamethylenetetramine and ammonium chloride, hydrochloric acid is set free and combines with the hexamethylenetetramine in accordance with equation (3) to form the hydrochloride. The hydrochloride is not a stable compound in aqueous solution and is hydrolysed in accordance with equation (4) giving rise to free ammonia and free formaldehyde, both of which products can volatilize with steam in the evaporation.

It follows from the nature of the hydrolytic reactions discussed above that when an aqueous solution of hexamethylenetetramine and ammonium chloride is evaporated there is an actual loss of hexamethylenetetramine in the form of free ammonia and free formaldehyde and that there is also formed a greater or less amount of hexamethylenetetramine hydrochloride. The amounts of hexamethylenetetramine actually lost to the final residue and the amount of hydrochloride formed are dependent upon conditions. If precautionary measures are not taken during the evaporation to suppress the hydrolytic effects several per cent of the hexamethylenetetramine may escape and practically all of the remainder may exist in the final residue as the hydrochloride.

This is particularly true if the liquors resulting from the reaction between aqueous ammonia and methylene chloride are evaporated without taking due precautions; 80% or more of the hexamethylenetetramine in the residue from such solutions cannot be extracted with chloroform or other solvents due to the fact that it exists as the hydrochloride.

In my application Serial No. 691,673, filed in the United States Patent Office February 9, 1924, I have described a method of effecting seperation of hexamethylenetetramine and ammonium chloride from solution by evaporating the solution in such a way that the liquor, at all times, is in an ammoniacal condition, drying the residual salts in the presence of ammonia gas, and finally extracting the hexamethylenetetramine with chloroform or other suitable solvents.

In my application Serial No. 728,463, filed of even date herewith, I have described another method of effecting separation which consists in surcharging the liquor with gaseous ammonia and "salting out" the hexamethylenetetramine, then removing from the hexamethylenetetramine the solution of ammonium chloride, and recovering the ammonium chloride from the solution by a method of precipitation. This last mentioned process is based on the discoveries that the solubility of hexamethylenetetramine in water is greatly reduced and the solubility of ammonium chloride is greatly increased by the presence of ammonia. In both cases, the hydrolytic effects are obviated and quantitative recovery of hexamethylenetetramine is attained.

In the process described and claimed herein, I utilize the aqueous solution of the two salts for the manufacture of phenolic resins.

In the application of C. B. Carter and A. E. Coxe, No. 583,914, filed August 23, 1922, is described a process for producing phenolic condensation products by reacting upon a phenolic body, such as phenol, cresol, naphthol and their homologs, with methylene chloride and ammonia, sufficient ammonia being present in the reaction mixture to combine with all chlorine contained in the methylene chloride. As indicated above, in the present process hexamethylenetetramine and ammonium chloride are first formed in solution and the liquor is utilized for digesting a phenolic body and producing the condensation product.

Phenolic bodies, such as phenol, cresol, etc. react readily with the hexamethylenetetramine contained in the aqueous liquor obtained by the action of methylene chloride on aqueous ammonia solutions. That is, the reaction can successfully be carried out by utilizing a solution of hexamethylenetetramine and ammonium chloride. This may be readily demonstrated by placing a few grams of phenol or cresol in a flask with a sufficient quantity of the liquor to produce a fusible, soluble resin, and heat the flask under a reflux condensor, at a temperature of about 100°, for a period of from one to two hours. Reaction takes place readily and smoothly. The resin being heavier than the liquor collects at the bottom of the vessel, and the bulk of the aqueous liquor containing the ammonium chloride can be removed by simple decantation, after which the resin can be washed by agitation or kneading with hot or cold water in order to remove all ammonium chloride. This last step is important, and the resin should be thoroughly washed and purified, but this can readily be accomplished in accordance with the present process.

The solution of hexamethylenetetramine and ammonium chloride preferably is obtained by introducing methylene chloride and aqueous ammonia into an autoclave, the ammonia being taken in excess to the extent of 300 or 400 per cent above the theoretical proportions, and heating the autoclave at a temperature of about 100° C. until the reaction is complete. This liquor may then be passed to a still and the excess ammonia distilled off, after which the liquor may pass to a digester, into which a sufficient quantity of the phenolic body may be charged. The digester may be maintained at a suitable temperature, say at a temperature of about 100° C. until the condensation is completed.

Another method of obtaining the solution of hexamethylenetetramine and ammonium chloride for use in the process is to cause a reaction between methylene chloride and liquid ammonia, employing ammonia in large excess, distill off the excess ammonia after completion of the reaction, and dissolve the salts in water.

In carrying out the present process, it is desirable to employ a considerable excess of the phenolic body, preferably about 50 per cent excess, above that which is required to combine with the hexamethylenetetramine present in the solution to form an infusible and substantially insoluble condensation product. That is, by the present process, the condensation product will first be produced as a distinctly fusible and soluble product. After the purification, a sufficient quantity of an active methylene body will be added to the fusible product to produce the final infusible product.

The following example will illustrate the manner in which the fusible and soluble condensation product may be formed:

Place in a 100 cc. flask, twenty grams of phenol and 37.5 cc. of a liquor containing 3.3 grams of hexamethylenetetramine and 7.2 grams of ammonium chloride; heat at boiling point under a reflux condensor for a period of one hour; then cool the flask. This produces a viscous resin corresponding with resin produced by known processes, employing about nine mols of phenol and one mol of hexamethylenetetramine. Additional boiling would not change the character of the resin, and it thus appears that the reaction is completed in one hour, or less. Such a resin is scarcely fluid enough to be agitated with water at room temperature, but can be kneaded between the fingers at 10° C. to 15° C., and washed with running water. At higher temperature, washing can be performed by agitation with hot water. The washed resin possesses all the properties of resins made by known processes, for example, the fusible, soluble resin produced by condensing about nine mols of phenol with one mol of hexamethylenetetramine. Such a resin possesses about one and one-half phenolic groups to each methylene group.

As carried out above, the reaction mixture contained no ammonia other than that liberated in the reaction. The reaction takes place readily in the presence of ammonia, but in case it is carried out under atmospheric pressure, as described above, most of the ammonia is expelled during the boiling operation.

The reaction may be carried out in practice as follows. The phenol or other phenolic body is placed in a suitable still or digester, equipped with a reflux condenser, together with sufficient amounts of the liquor from the hexamethylenetetramine reaction to produce a fusible soluble resin of the desired degree of fluidity, or mobility, for ease in washing. Heat is then applied and the mixture brought to and maintained at the boil for one or two hours in order to effect complete reaction. During this operation large volumes of ammonia will be evolved from the digester if the liquor has not been distilled previously in order to remove the excess ammonia used in the hexamethylenetetramine reaction. In event the excess has not been removed by distillation the reflux condensor should be equipped with suitable connections for the recovery of the ammonia.

The resinification having been completed in accordance with the description given above, the contents of the digester are discharged into a vessel where the aqueous ammonium chloride is removed by decantation from the resin and all ammonium chloride washed out by agitation or kneading with water. The combined liquor and wash water then go to a still where they are treated with hydrated lime to liberate ammonia from the ammonium chloride, the ammonia being absorbed in water and returned to the hexamethylenetetramine system.

The accompanying drawing illustrates, diagrammatically, suitable apparatus for practicing the process in the preferred manner, and the process may be further explained with reference thereto.

In the drawing, A represents an autoclave drawing supplies of methylene chloride and aqueous ammonia from storage tanks B and C, respectively. A mixture of these materials is heated in A until reaction is complete, all methylene chloride being converted into hexamethylenetetramine and ammonium chloride. The contents of autoclave A then are expelled into a still D where excess ammonia is distilled off, the gaseous ammonia going to an absorber E, where it is taken up in water from storage F, and finally collects in storage C. The residual liquor from still D containing hexamethylenetetramine, ammonium chloride and some small amount of free ammonia passes into digester G where it is mixed with the necessary amount of phenol from P and is digested until all hexamethylenetetramine has reacted with phenol to form a resin. Any ammonia evolved during digestion passes through MN to absorber E and finally collects in storage C in the form of aqueous ammonia. The resin and digester liquor from G go to a washer H where the resin is agitated with water to remove all ammonium chloride, the resin being discharged into storage I and the aqueous ammonium chloride into still J. In still J the solution is treated with sufficient hydrated lime to liberate all ammonia from the ammonium chloride and is subjected to distillation to remove ammonia which passes through QN to absorber E and collects in aqueous form in C. The residual liquor from still J carries calcium chloride which may be recovered by evaporation of the water if recovery is to be made.

It is to be noted that the hexamethylenetetramine reacting with the phenol in digester G liberates ammonia. Hence it follows that little ammonia is actually consumed in the operation, since all ammonia combining to form methylene chloride in the hexamethylenetetramine reaction is recovered by treating with lime. In operation, however, some small amount of ammonia may be carried out of the system by the resin and such ammonia must be made good by adding aqueous ammonia to the system from time to time.

It is also to be noted that phenol is to be taken with the hexamethylenetetramine solution in such proportions as to produce a resin of a fluidity or mobility suitable for ease in washing. A resin containing 9 to 10 mols of phenol to 6 methylene groups is suitable for the purpose.

The fusible resin produced in accordance with the method described above is subjected to distillation in order to remove all water and a portion of the free phenol. The distillation may be effected by boiling or by blowing air through the heated resin and as much as 10% of the original phenol may be removed. The resin resulting from this treatment may be finished in the usual way by adding an active methylene body, such as formaldehyde or hexamethylenetetramine, in such proportion as to give a final mass containing about one phenol group for each methylene group, and heating to finish the reaction. Prior to the final heating the mass may be mixed with fillers or taken up in suitable solvents to form varnishes, or utilized in the various compounds for which phenolic resins are used.

In the drawing, additional lines of communication, or routes, between the various vessels and devices are designated by the numerals 1 to 12 inclusive. The arrows indicate the course followed by the products in the routings.

The proportions of materials employed may be varied. For example, a smaller proportion of phenol may be employed, but as the proportion of phenol is reduced the resultant condensation product approaches more and more closely to the final, infusible and insoluble product.

It is possible to employ substantially equi-molecular proportions of hexamethylenetetramine and the phenolic body, but this leads to the infusible product which cannot be readily freed from water and ammonium chloride, whereas by employing the two-step process described, the final product ultimately obtained is free from deleterious substances.

The foregoing detailed description has been given for clearness of understanding only, and no unnecessary limitations should be understood therefrom, but the appended claims should be construed as broadly as permissible, in view of the prior art.

What I regard as new, and desire to secure by Letters Patent, is:

1. The method of producing a phenolic condensation product which comprises: producing hexamethylenetetramine and ammonium chloride by reaction between methylene chloride and ammonia; digesting a phenolic body with a solution of said salts, the phenolic body being taken in excess of the molecular proportions with respect to the hexamethylenetetramine formed in the reaction; separating the fusible, soluble resin thus produced from the liquor; and purifying the resin.

2. The method of producing a phenolic condensation product which comprises: digesting a phenolic body in a solution of hexamethylenetetramine and ammonium chloride, the phenolic body being taken in sufficient excess with respect to the hexamethylenetetramine present in the solution to form a fusible, soluble condensation product, separating the liquor from the resin; and purifying the resin by washing with water.

3. The method of producing a phenolic condensation product which comprises: causing a reaction between methylene chloride and aqueous ammonia, the ammonia being present in excess of the theoretical requirement; distilling off the ammonia and returning it to the source of ammonia supply; charging the residual liquor and a phenolic body into a digester and effecting condensation of the phenolic body; separating the liquor from the condensation product; and purifying the condensation product.

4. The method of producing a phenolic condensation product which comprises: heating together a phenolic body and a solution of hexamethylenetetramine and ammonium chloride; separating the liquor from the condensation product thus formed; removing some of the ammonium chloride from the solution; heating together methylene chloride and some of the remaining solution in the presence of ammonia and employing the resultant liquor in the process to digest an additional quantity of the phenolic body.

5. The method of producing a phenolic condensation product which comprises: heating a mixture of a phenolic body and a solution of hexamethylenetetramine and ammonium chloride, the phenolic body being taken in sufficient excess with respect to the hexamethylenetetramine present in the solution to form a fusible, soluble, condensation product; separating the liquor from the resin; purifying the resin and adding to the resin a sufficient quantity of an active methylene body to combine with the resin and form a substantially infusible and insoluble product.

CARNIE B. CARTER.